United States Patent [19]
Rando

[11] Patent Number: 6,073,354
[45] Date of Patent: Jun. 13, 2000

[54] PLUMB LASER BEAM GENERATOR WITH FLOATING TELESCOPE

[75] Inventor: Joseph F. Rando, Los Altos Hills, Calif.

[73] Assignee: LeveLite Technology, Inc., Mountain View, Calif.

[21] Appl. No.: 09/008,938

[22] Filed: Jan. 20, 1998

[51] Int. Cl.[7] ............................. G01C 15/14; G01C 15/10
[52] U.S. Cl. ................................. 33/291; 33/377; 33/396; 356/148
[58] Field of Search ............................ 33/276, 278, 281, 33/282, 283, 286, 290, 291, 292, DIG. 21, 365, 377, 396, 534; 356/138, 139.06, 372, 148, 149, 248, 249

[56] References Cited

U.S. PATENT DOCUMENTS

| | | | |
|---|---|---|---|
| 2,633,050 | 3/1953 | Baker | 356/250 |
| 3,655,274 | 4/1972 | Craig | 359/249 |
| 3,820,903 | 6/1974 | Kindl et al. | 356/138 |
| 5,184,406 | 2/1993 | Swierski | 33/227 |
| 5,459,932 | 10/1995 | Rando | 33/291 |
| 5,524,352 | 6/1996 | Rando et al. | 33/291 |
| 5,541,727 | 7/1996 | Rando et al. | 356/149 |
| 5,619,802 | 4/1997 | Rando et al. | 33/291 |
| 5,684,579 | 11/1997 | Ohtomo et al. | 356/249 |
| 5,847,820 | 12/1998 | Hamar | 356/148 |

*Primary Examiner*—Andrew H. Hirshfeld
*Assistant Examiner*—R. Alexander Smith
*Attorney, Agent, or Firm*—Thomas M. Freiburger

[57] ABSTRACT

An instrument for use in alignment, plumb and leveling functions includes a laser diode projecting a beam through a liquid contained in a vessel. Floating in the liquid is a compensator float which includes telescope optics so as to diminish the angle of rays leaving the telescope as compared to rays entering the telescope. The laser beam passes through the liquid and through the telescope, exiting from a window at the top or side of the instrument. By selecting the proper relationship between the telescope's magnification and the index of refraction of the liquid, the instrument is made to correct for small tilt angles of its housing. Various embodiments are disclosed for projecting upward or downward plumb beams, level beams or both.

19 Claims, 10 Drawing Sheets

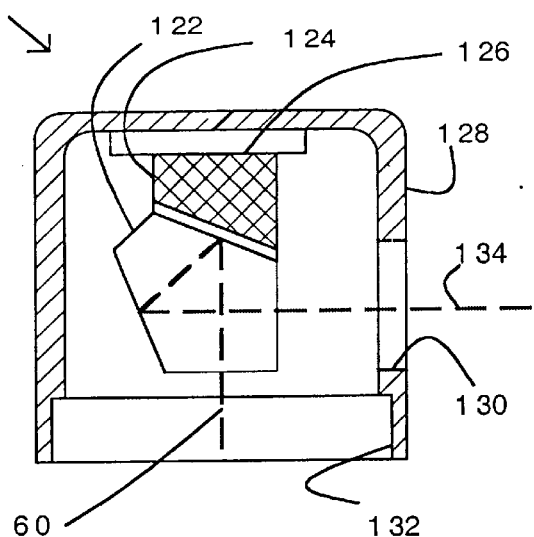
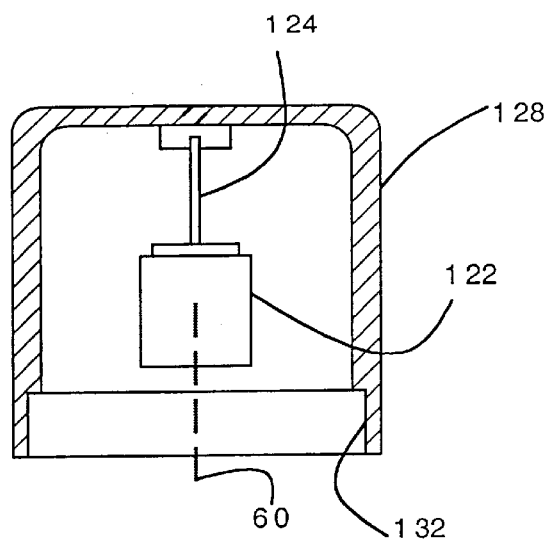
Fig. 12    Fig. 13
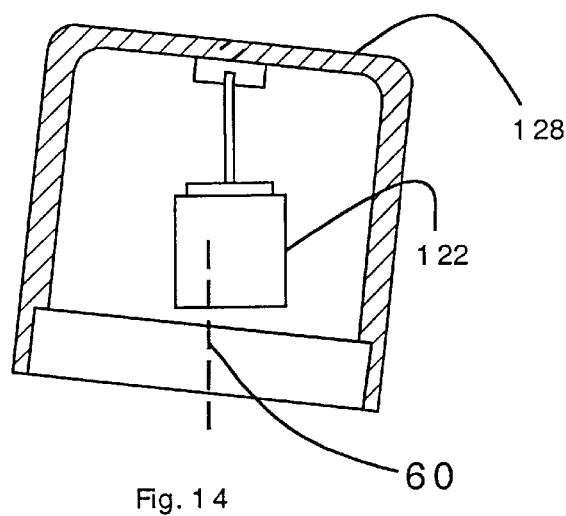
Fig. 14

PLUMB LASER BEAM GENERATOR WITH FLOATING TELESCOPE

BACKGROUND OF THE INVENTION

This invention relates to hand tools, and in particular the invention is concerned with a compact hand tool for projecting plumb and level reference beams of visible light for precise alignment.

A system for generating reference beams based on first generating a plumb beam of light is the invention described herein. Many self-leveling plumb laser beam generators have used ball bearings, wires, and springs. There are also many instruments which have used electronic sensors and motors to level the projector as required. A low cost automatic self-leveling laser instrument is described in U.S. Pat. Nos. 5,459,932, 5,524,352, 5,541,727, and 5,619,802 assigned to the same assignee as the present invention. The instruments of those patents are similar in application to the present invention. The disclosure of those patents is incorporated herein by reference.

In Swierski, U.S. Pat. No. 5,184,406, the instrument of which is shown in FIG. 1, a battery operated laser projector 1 is mounted in a float 2 which floats in a partially closed pan 8 of water 6. Although this does produce a plumb beam of light, there are many disadvantages to this system. The lack of liquid containment makes it difficult to transport and set up. The accuracy can be adversely affected by mishandling of the float or the battery insertion.

SUMMARY OF THE INVENTION

The present invention uses a floating telescope to generate a plumb beam of laser light by redirecting a laser beam using a telescope which is floating below the surface of a liquid. The axis of the floating telescope is always vertical because of the location of the center of gravity and the center of buoyancy in the same way a boat or submarine remains vertical at sea. The laser module is located below the bath of liquid and projects a collimated laser beam up through the vessel and through the floating telescope and out an exit window of the instrument. The compensatory effect of the telescope combined with changes of index of refraction as the beam passes through the telescope and the vessel produces a fully compensated plumb laser beam emanating from the upper end of the vessel. The vessel is sealed, and problems of prior floating plumb beam generators described above are overcome.

DESCRIPTION OF THE DRAWINGS

FIGS. 12, 13, and 14 are sectional views, somewhat schematic, showing a self-leveling pentaprism device for producing a level beam from a plumb beam generator as in FIG. 6.

DESCRIPTION OF PREFERRED EMBODIMENTS

Figure 1:
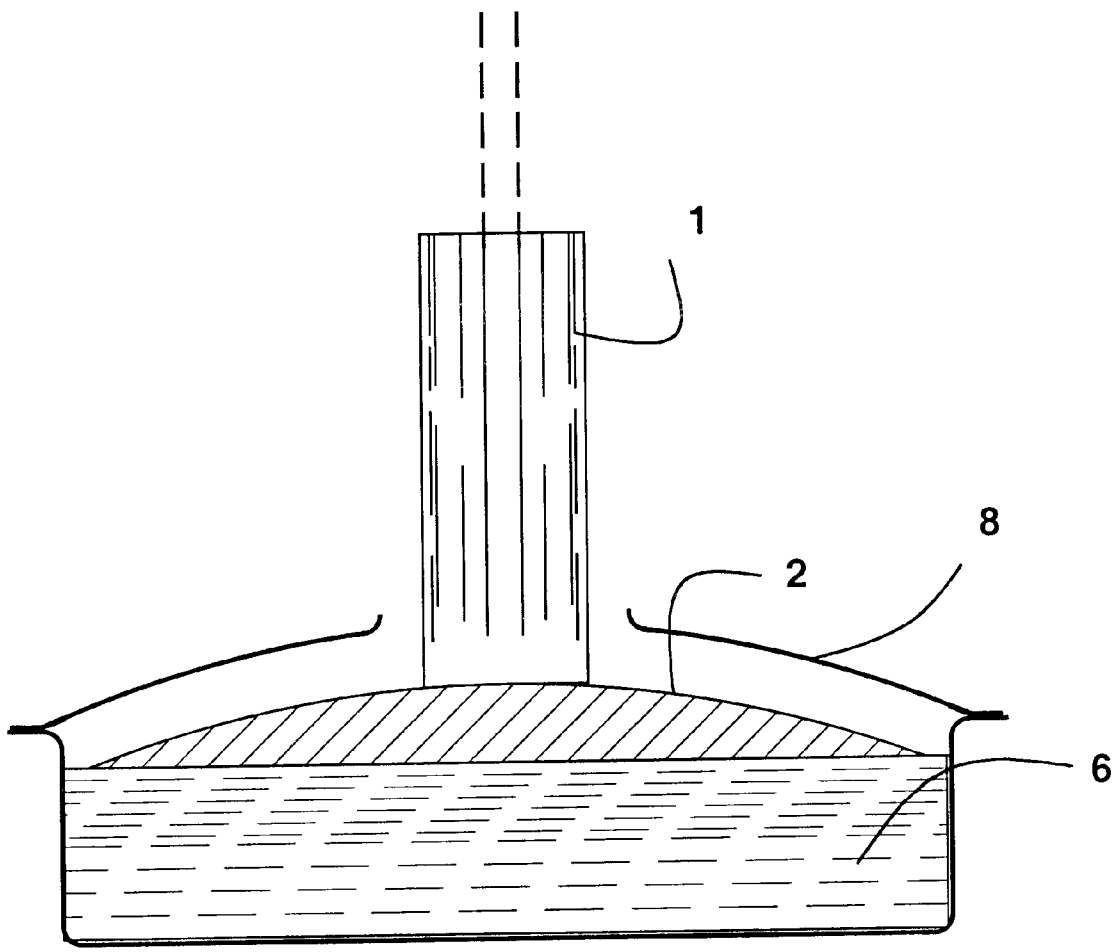
FIG. 1 is a schematic elevational section view showing a plumb laser beam generator according to prior art.
Figure 2:
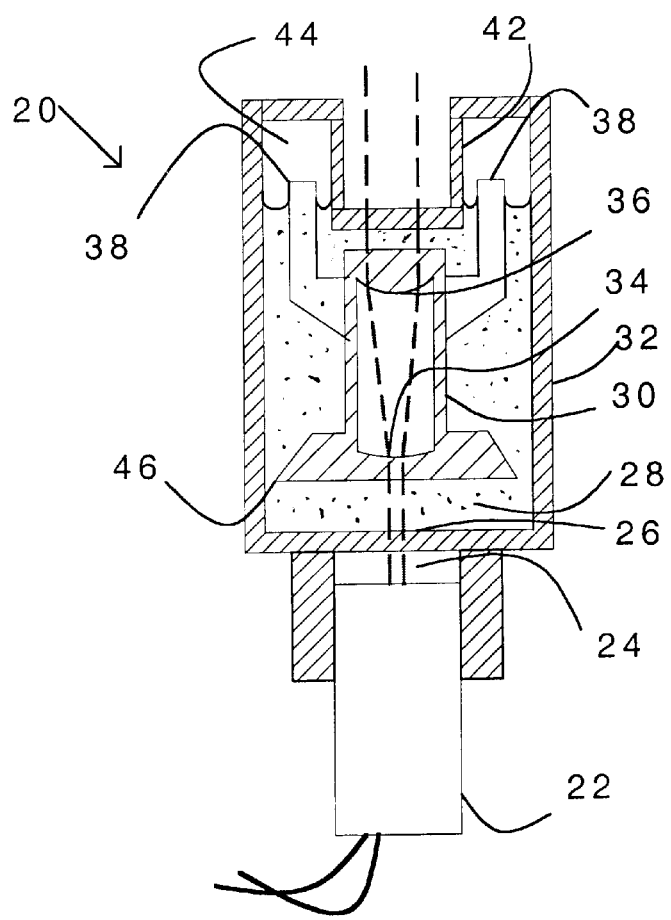
FIGS. 2 and 3 are schematic elevational section views showing a plumb beam generator according to the invention.

Referring to the schematic view of FIG. 2, the number 20 corresponds to the instrument of the invention generally. A laser module 22 produces a collimated laser beam 24 which passes through a lower window 26 and into a transparent liquid 28.

A cylindrical floating telescope 30 is contained in a sealed, preferably cylindrical vessel 32 which is partially filled with the liquid 28. The telescope consists of two lenses 34 and 36 and an air space between. Generally speaking, a telescope magnifies the angle between incoming rays so that it may be more easily seen. In this case the magnification is approximately three times. A collimated light beam entering the telescope defined by the lenses 34 and 36 remains collimated as it exits the telescope. In this invention the light travels in the opposite direction from that of a viewing telescope so that the angle of the ray relative to the axis of the telescope is reduced by the power of the telescope.

The weight of the float 30 is chosen so that two appendages 38 on the floating telescope protrude above the surface. In this way the telescope's optical path is always in the fluid and the float is free to align itself to the vertical. The effects of surface tension at the locations where the appendages 38 exit the fluid are negligible because of their size.

A re-entrant section 42 of the vessel further ensures that the exit window is and remains in the fluid. An air pocket 44 is present to allow the volume of fluid in the vessel to change with temperature without causing vessel-distorting pressure changes.

A lower portion 46 of the float 30 fits the diameter of the vessel closely to keep the lens centered on the beam.

Figure 3:
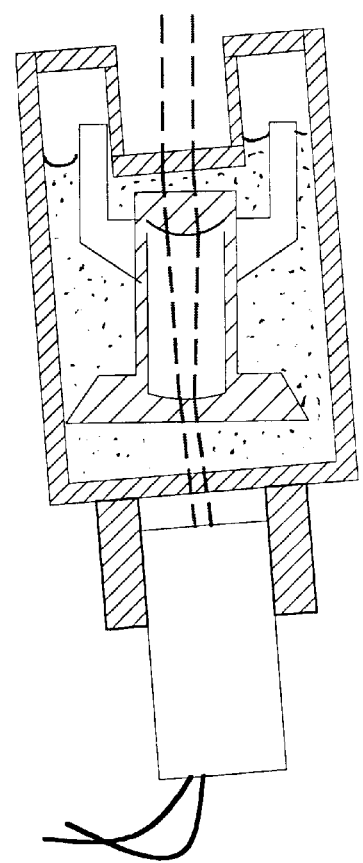

FIG. 3 shows schematically the beam path for a tilted compensator. Note that the angle of the beam changes within the telescope as well as at the exit window, due to passage through the lenses and refraction index of the liquid. The final beam is, however, vertical.

Figure 4:
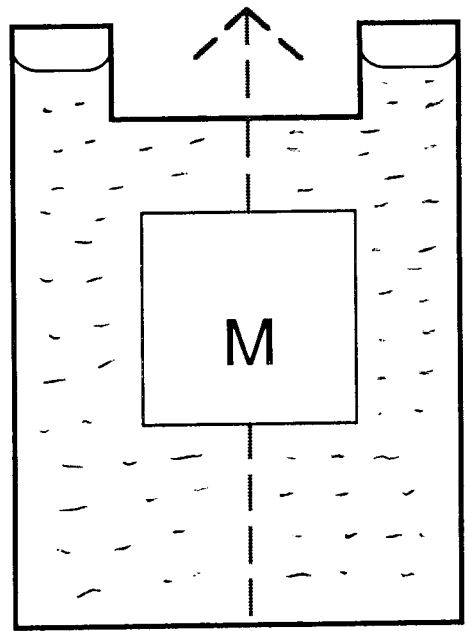
FIG. 4 is a simplified schematic view serving to illustrate the principles of the invention.

FIG. 4 may be used in a first order analysis of the optical path. The light beam and axis of the vessel and telescope are aligned in the vertical direction. In this case the beam passes vertically through the system.

Figure 5:
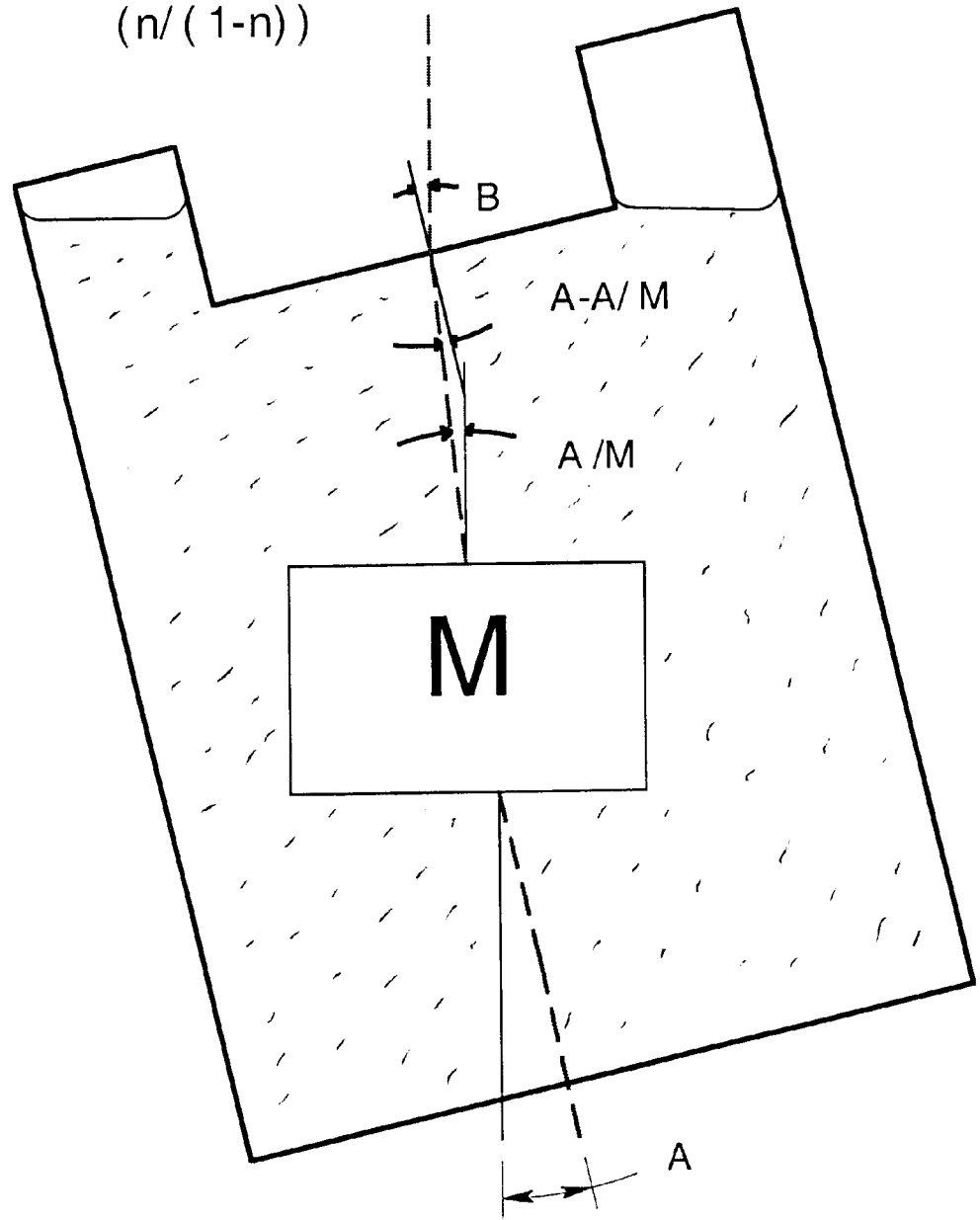
FIG. 5 is a view similar to FIG. 4, schematically indicating the device as tilted and illustrating the compensating effects of the telescope and the indices of refraction.

In FIG. 5 the housing of the vessel is tilted so that the beam makes an angle A with the vertical. The angle of the beam entering the telescope is A and the optics of the telescope reduce the angle to A/M where M is the magnification, i.e., optical power, of the telescope. The angle between the beam and the normal to the exit window, as the beam approaches, is now A−A/M. B is the angle the exiting beam makes with the normal to the exit window. From Snell's Law sin B=n sin (A−A/M), where n=index of refraction of the liquid. By setting B equal to A and approximating the sin A=A (for small A), we arrive at the compensation condition, M=[n/(n−1)]. In such a system the exit beam remains plumb or pointed in the vertical direction even though the platform on which it is resting is not level.

Figure 6:
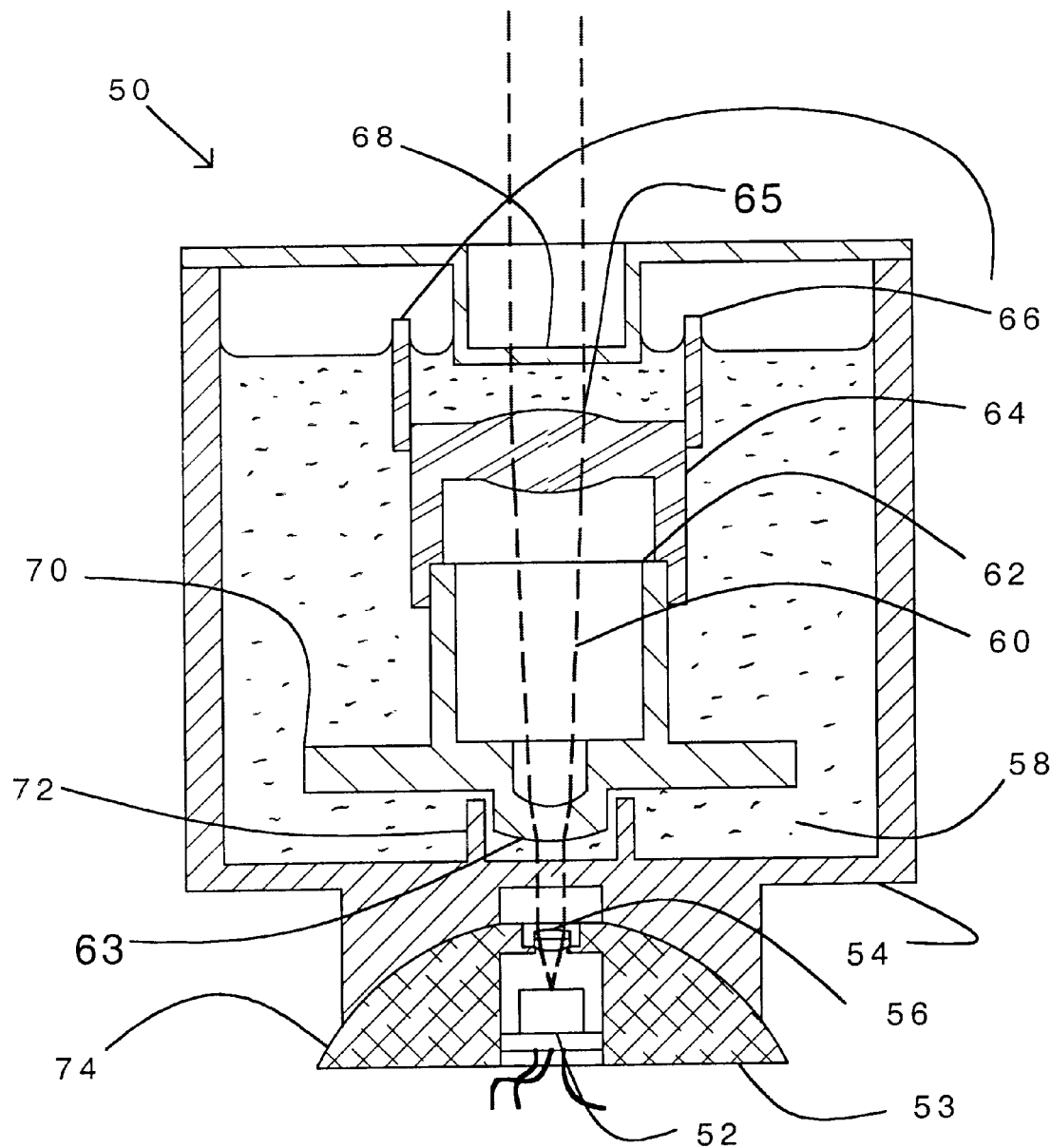
FIG. 6 is an elevational section view showing one preferred embodiment of a tilt compensating instrument of the invention.

FIG. 6 is a section view of the compensator according to a preferred embodiment, showing a laser diode 52 in a laser diode holder 53 below a transparent liquid vessel 54. A lens 56 collimates the beam. The liquid 58 is a transparent liquid, for example, turpentine or kerosene. These liquids provide sufficient damping of the float motion while allowing quick response. The laser beam 60 from the diode is expanded by optics in a lower telescope half 62 which is registered to an upper telescope half 64. The two halves fit together, one into the other, registering the distance between the two optics which include lenses 63 and 65. In this way the telescope's upper and lower pieces may be fitted together without adjustment. These parts may be molded out of clear plastic and chemically sealed with a solvent. Two or more small diameter plastic cylinders or rods 66 at the top of the upper telescope half 64 serve to keep the telescope float below the surface of the liquid. A reentrant window 68 keeps the region above the lens under the fluid surface. A wide section of material 70 at the bottom of the lower telescope half ensures that the center of gravity is well below the center of buoyancy. A raised ring or lip 72 on the floor of the liquid vessel 54 keeps the lower optical surface centered on the laser beam. A spherical surface 74 between the laser diode holder and the liquid vessel allows the alignment or calibration of the compensator.

Figure 7:
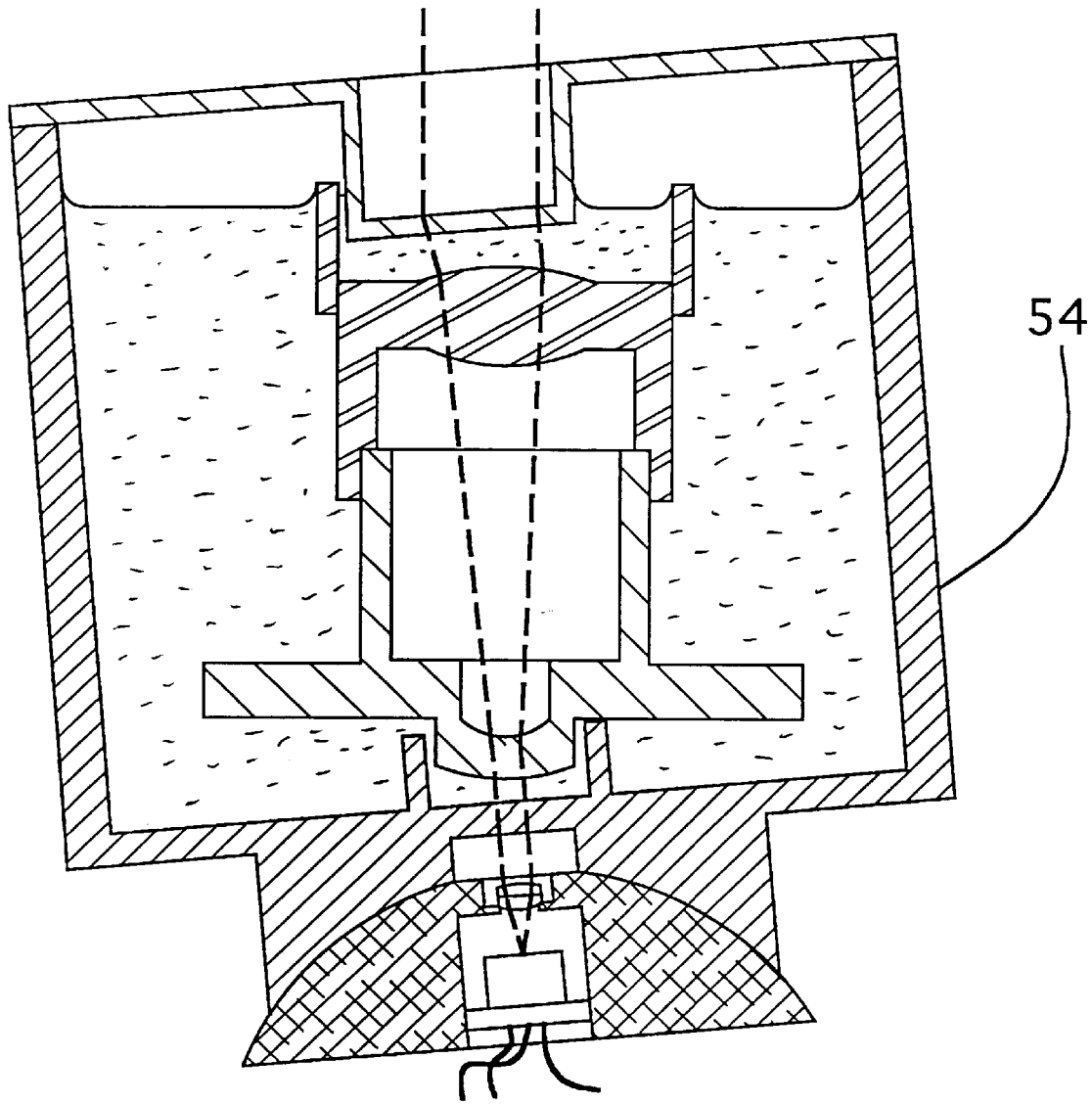
FIG. 7 is a view similar to FIG. 6 but showing the instrument housing tilted and the exit beam remaining plumb.

FIG. 7 shows the instrument as in FIG. 6 except that the housing 54 has been tilted. Note that the floating telescope orientation remains vertical.

Figure 8:
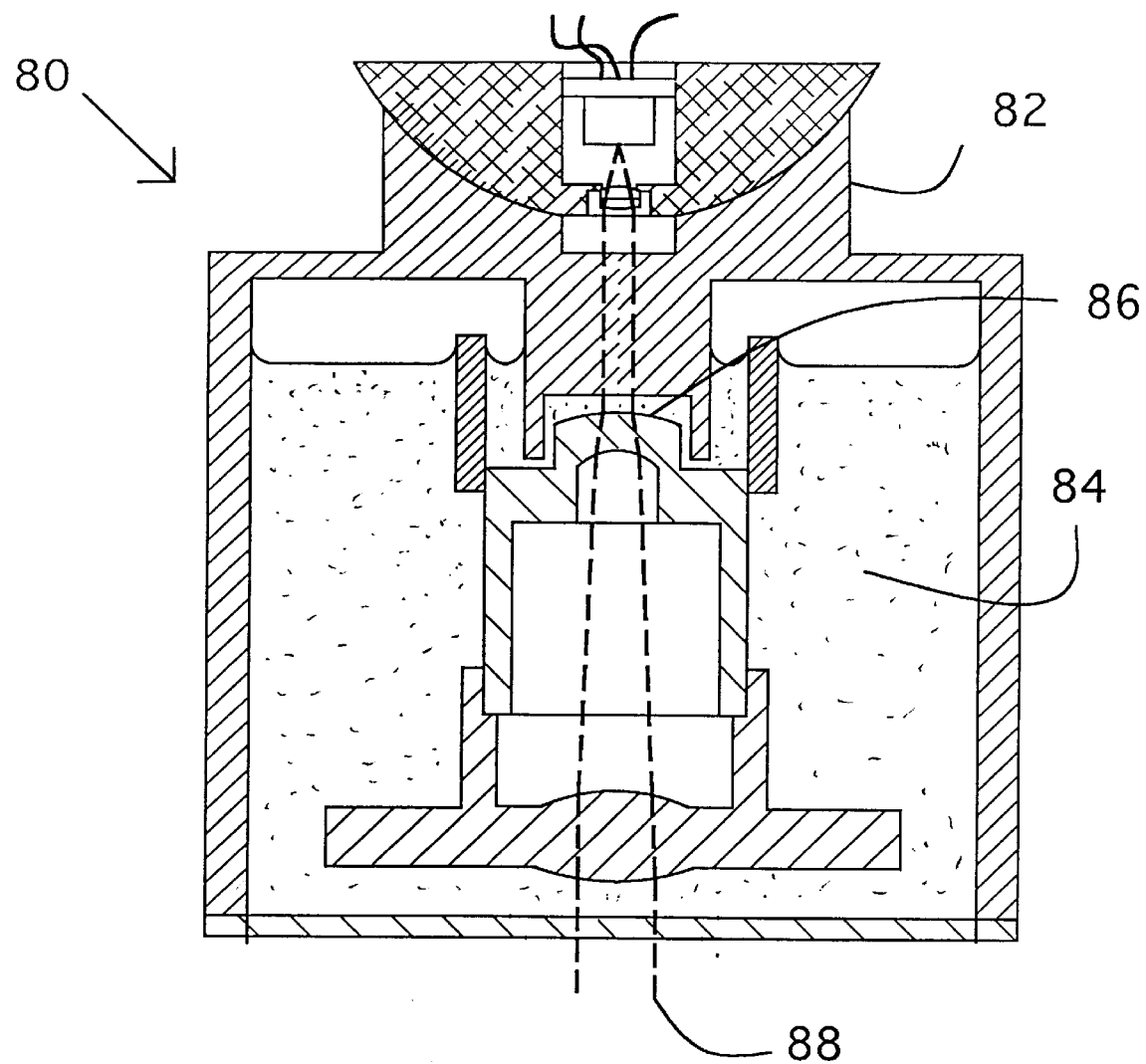
FIG. 8 is an elevational section view showing another preferred embodiment in which the laser beam is directed downwardly rather than upwardly, but involving the same principles.

FIG. 8 is a cross sectional view of a preferred embodiment of a compensator 80 in which the beam is directed in the vertically down direction using the same principles. The liquid vessel 82 has been rearranged to capture the floating telescope 84 at its top where the negative lens 86 is located. In this case the exit beam 88 is downwardly directed.

Figure 9:
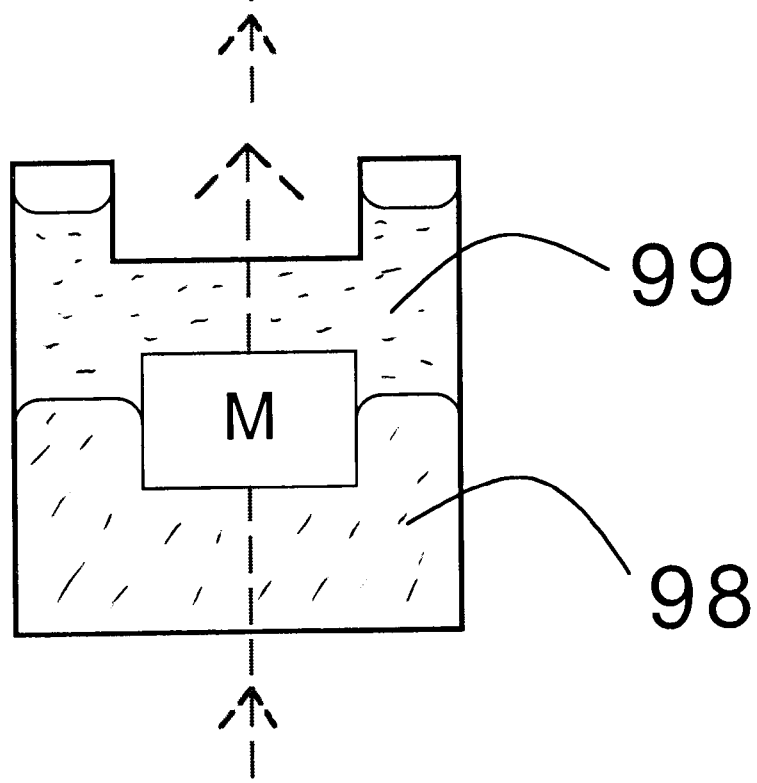
FIG. 9 is a schematic elevation view showing a variation in which the vessel contains two liquids of different densities, as an arrangement for keeping the floating telescope below the surface of the liquid.

FIG. 9 is a schematic view showing an alternate arrangement for keeping the floating telescope below the surface of the liquid. A liquid 98 of high density and a liquid 99 of low density are placed in the same vessel. The density of the float is adjusted to a value between the liquids. The value of M, the telescope magnification, is selected to provide the necessary compensation as described previously. If the indices of refraction of the two liquids differ, the formula becomes somewhat more complicated than described above, but it can nonetheless be solved. In this way the float is held below the surface of the liquids by hydrostatic forces. As in the above embodiments, the weight distribution in the float is selected so that the float remains upright.

Figure 10:
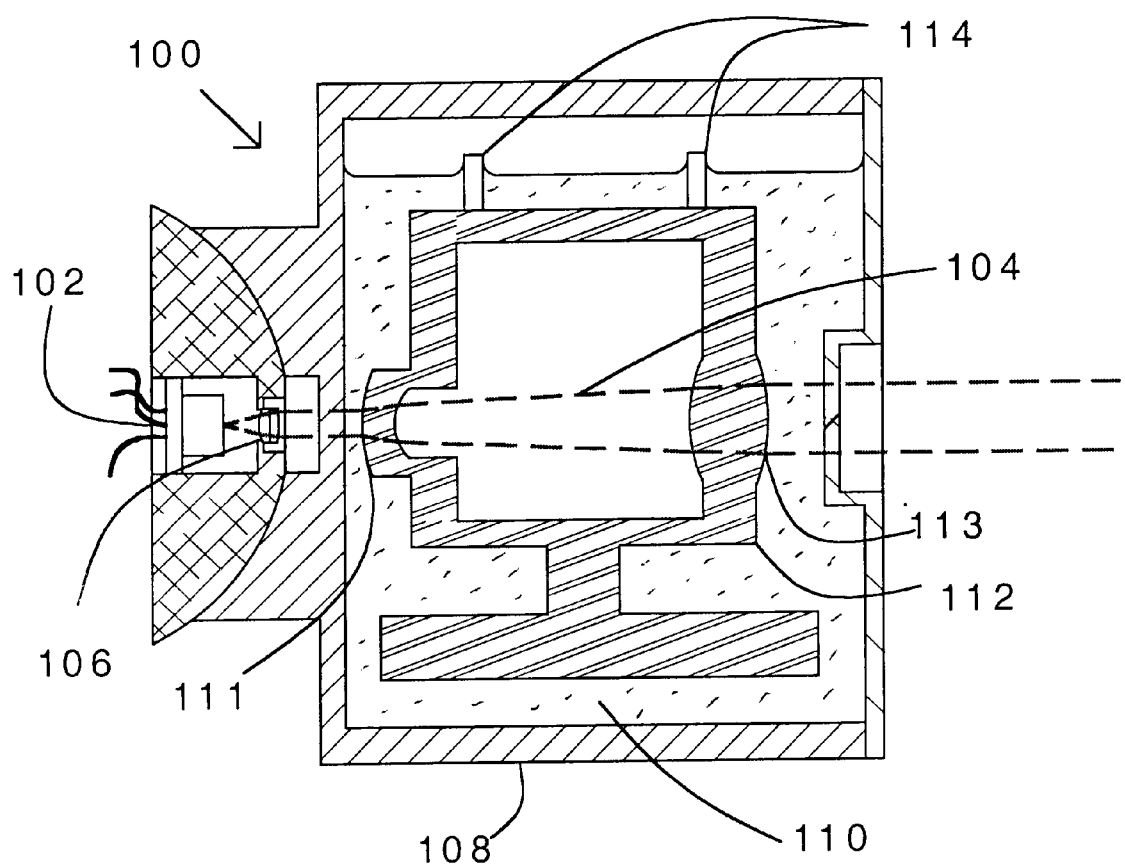
FIG. 10 is an elevational section view showing an instrument with a floating telescope to produce a level beam despite tilt of the housing.

FIG. 10 is a section view showing a floating telescope design used to produce a level beam. It uses the same principles described above. The floating telescope compensator instrument is described generally by the number 100. A laser diode 102 produces a laser beam 104 which is first collimated by a lens 106. The beam passes into a transparent housing 108 filled with a transparent liquid 110. A float 112 has two built-in lenses 111, 113 which minify the angle of the incoming beam. The float is free to orient itself to the vertical and remains below the surface of the liquid. Small cylindrical pegs 114 help maintain the float just below the surface.

Figure 11:
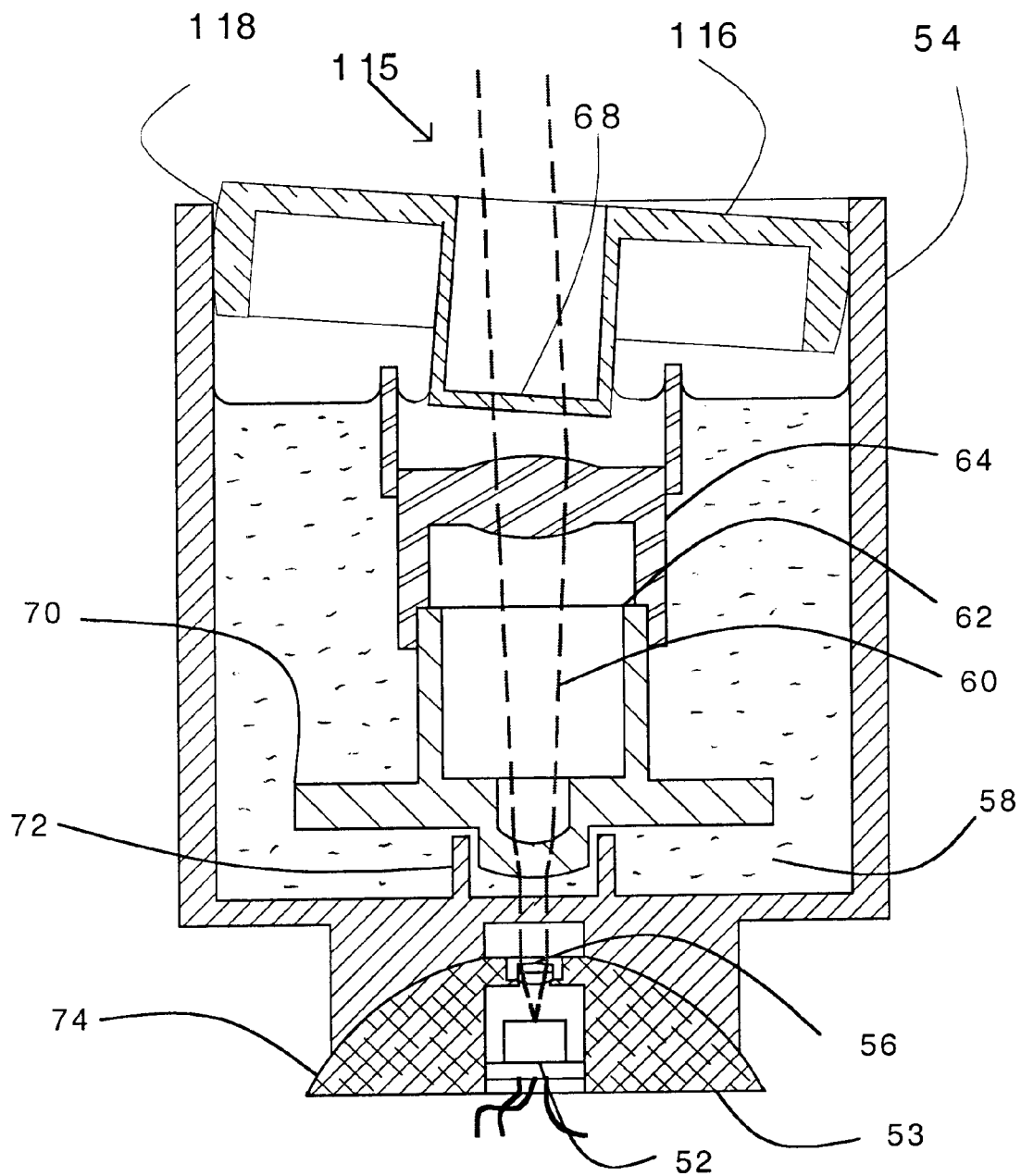
FIG. 11 is an elevation view in section showing another embodiment of an instrument which is similar to that of FIG. 6 but with an exit window providing fine adjustment.

In an alternate preferred embodiment 115 shown in section view FIG. 11, fine calibration of the instrument can be achieved by tilting the exit window 68. This embodiment is otherwise similar to that of FIG. 6, and reference numbers correspond to those used in FIG. 6. The transparent housing 54 is open at its top and is sealed by a window-bearing member 116 which has a spherical surface 118 which fits snugly in the open housing as shown. By tilting of this member, small deviations of the plumb beam may be introduced for the purpose of calibration of the compensator. An adhesive (not shown) can be used to seal the member 116 to the housing at the spherical surface.

A level reference beam can be created from the plumb beam by using a self-leveling pentaprism as shown generally by 120 in FIG. 12. A pentaprism 122 is hung by a flexible suspension member 124 from a support member 126 on the inside of a cap 128. A hole 130 in the cap allows the beam to exit the cap. This flexible member need only level approximately in one axis (tilting in and out of the page in FIG. 12) to produce an accurate 90 degree deviation of the beam. The flexible member 124 may be made of thin or very flexible rubber to combine flexibility with damping.

An inside lip 132 allows the cap 128 to fit over the plumb beam generator shown in FIG. 6. By rotating the cap by hand a level reference plane can be defined with the exiting horizontal beam 134. The lip can also provide some height adjustment by allowing the cap to slide up and down on the upper edge of the housing of the device shown in FIG. 6.

FIG. 13 is a section view of the pentaprism hanging from the cap, from a 90 degree rotated vantage point as compared to FIG. 12. FIG. 14, similar to FIG. 13, shows how the flexible member 122 allows the pentaprism to self level in one axis, the self-leveling now being within the plane of the drawing.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. An instrument for producing a plumb or level laser reference beam regardless of small tilt angles of the instrument, comprising:

a housing comprising a vessel containing a liquid, a laser light source projector, positioned outside the vessel so as to project a laser beam generally vertically or horizontally through a window of the vessel and into the liquid within the vessel, a compensator float positioned to float within the liquid in the vessel generally at a constant level within the liquid, the float being self-orienting so as to remain floating upright in the liquid if the vessel is tilted, the compensator float including telescope means for reducing the angle of light rays relative to an axis of the telescope means as the rays pass through the telescope means, an exit window in the housing, at a position opposite the light source projector and below the level of the liquid in the vessel, the window being positioned to transmit a light beam exiting from the compensator float and from the liquid, and the telescope means having optical power with a magnification which, in combination with the index of refraction of the liquid, corrects for small tilt angles of the housing by maintaining the beam exiting the instrument in a plumb orientation in the case of a laser reference beam projected generally vertically, or in a level orientation in the case of a laser reference beam projected generally horizontally.

2. The instrument of claim 1, wherein the compensator float includes projections extending above the surface of the liquid within the vessel, generally maintaining the float at a constant level within the liquid.

3. The instrument of claim 1, wherein the compensator float comprises a molded plastic two-piece float of two pieces assembled together, each piece having a lens of the telescope means formed in the molded plastic.

4. The instrument of claim 3, wherein the two pieces of the compensator float are each generally cylindrical and are telescopically assembled together.

5. The instrument of claim 1, wherein the exit window of the housing includes means for tilt adjustment of the window relative to the vessel so as to adjust the angle of the exit window relative to the beam emerging from the telescope means, thus allowing a fine calibration adjustment for the beam exiting the instrument.

6. The instrument of claim 5, wherein the means for tilt adjustment comprises the exit window being formed in an end wall of the housing which is fitted within a cylindrical wall of the housing, and the end wall having a radially outer surface which is formed as a portion of a sphere so that the end wall can be tilted in any direction while the outer spherical surface remains in contact with an interior surface of the cylindrical wall of the housing.

7. The instrument of claim 1, wherein the laser light source projector is oriented generally horizontally on the housing, and wherein the telescope means of the compensator float operates generally on a horizontal axis, the exit window being positioned to transmit the exit beam horizontally.

8. The instrument of claim 1, wherein the laser light source projector is oriented to transmit the laser beam generally vertically through the housing, so that the beam exiting the instrument is plumb, and further including an accessory with means for mounting the accessory on the top of the instrument over the exit window so as to receive the exit beam from the instrument, the accessory having a pentaprism for receiving the plumb beam and transmitting the bean horizontally.

9. The apparatus of claim 8, wherein the accessory includes a cap-like housing, and flexible suspending means secured to the cap-like housing and to the pentaprism for substantially self-leveling the pentaprism in one plane relative to a tilt of the instrument and of the cap-like housing.

10. The instrument of claim 1, wherein the liquid within the vessel includes two liquids of different densities, a less dense liquid above a more dense liquid, and wherein the compensator float remains positioned at said generally constant level within the liquid by floating partially in the more dense liquid and partially in the less dense liquid, the float being completely submerged within the liquid.

11. The instrument of claim 1, wherein the telescope means of the compensator float has a magnification of n/(n−1), where n is the index of refraction of the liquid.

12. A self-aligning laser reference beam projecting instrument, comprising:

a laser beam generator:

a vessel containing a transparent liquid, the vessel having input and output vessel optical surfaces, the laser beam generator being positioned to project a laser beam into the vessel through the input optical surface, a self-orienting float within the liquid, remaining upright for small tilt angles of the vessel, the float including input and output float optical surfaces, with optical power defined between the float's input and output optical surfaces, the float with its optical surfaces being positioned generally in alignment with the vessel optical surfaces so as to maintain an optical path from the laser beam generator through the vessel input optical surface, through the float optical surfaces and out the vessel output optical surface, and said optical power being one which, in combination with the index of refraction of the liquid, corrects for small tilt angles of the housing by maintaining the laser beam exiting the instrument in a plumb or level orientation.

13. An instrument according to claim 12, wherein the laser beam generator comprises a collimated diode laser projector.

14. An instrument according to claim 12, wherein the vessel output optical surface comprises an exit window below the level of the liquid in the vessel, the vessel not being completely full of liquid.

15. An instrument according to claim 14, wherein the float includes upward extensions which extend above the surface of the liquid within the vessel so as to ensure that the output float optical surface remains at a substantially constant level below the surface of the liquid.

16. An instrument according to claim 12, wherein the liquid within the vessel includes two liquids of different densities, a less dense liquid above a more dense liquid, and wherein the float remains positioned at a generally constant level within the liquid by residing partially in the more dense liquid and partially in the less dense liquid, the float being completely submerged in the liquid.

17. An instrument according to claim 12, wherein the float optical surfaces define a telescope oriented to reduce the angle of light rays relative to an access of the telescope as the rays pass through the telescope, the telescope having a magnification of n/(n−1), where n is the index of refraction of the liquid.

18. An instrument according to claim 12, further including float capture means acting between the interior of the vessel and the float, for retaining the float input optical surface in position to receive the laser beam.

19. An instrument according to claim 12, wherein the self-orienting float comprises a molded plastic two-piece float of two pieces assembled together, each piece having one of said float optical surfaces.

* * * * *